United States Patent
Tamura et al.

(10) Patent No.: US 11,043,695 B2
(45) Date of Patent: Jun. 22, 2021

(54) LITHIUM-CONTAINING COMPOSITE OXIDE, CATHODE ACTIVE MATERIAL, POSITIVE ELECTRODE FOR LITHIUM ION SECONDARY BATTERY, AND LITHIUM ION SECONDARY BATTERY

(71) Applicant: SUMITOMO CHEMICAL COMPANY, LIMITED, Tokyo (JP)

(72) Inventors: Masahiko Tamura, Tokyo (JP); Tomoo Kato, Tokyo (JP); Takeshi Kawasato, Tokyo (JP); Ryo Eguchi, Tokyo (JP)

(73) Assignee: SUMITOMO CHEMICAL COMPANY, LIMITED, Tokyo (JP)

( * ) Notice: Subject to any disclaimer, the term of this patent is extended or adjusted under 35 U.S.C. 154(b) by 202 days.

(21) Appl. No.: 16/074,031

(22) PCT Filed: Feb. 3, 2017

(86) PCT No.: PCT/JP2017/004000
§ 371 (c)(1),
(2) Date: Jul. 30, 2018

(87) PCT Pub. No.: WO2017/135414
PCT Pub. Date: Aug. 10, 2017

(65) Prior Publication Data
US 2019/0027782 A1      Jan. 24, 2019

(30) Foreign Application Priority Data

Feb. 3, 2016   (JP) .............................. JP2016-019044

(51) Int. Cl.
*H01M 10/0525* (2010.01)
*C01G 53/00* (2006.01)
(Continued)

(52) U.S. Cl.
CPC ........ *H01M 10/0525* (2013.01); *C01G 53/00* (2013.01); *C01G 53/50* (2013.01);
(Continued)

(58) Field of Classification Search
CPC .. H01M 10/0525; H01M 4/131; H01M 4/505; H01M 4/525; H01M 2004/027;
(Continued)

(56) References Cited

U.S. PATENT DOCUMENTS

2004/0023113 A1* 2/2004 Suhara ................. C01G 33/006
429/231.1
2015/0357641 A1 12/2015 Sugie et al.
(Continued)

FOREIGN PATENT DOCUMENTS

JP    2006-147499 A    6/2006
JP    2006-232608 A    9/2006
(Continued)

OTHER PUBLICATIONS

Liu et al., "Synthesis and electrochemical performance of Li1+xNi0.5Mn0.3Co0.2O2 (0<x<0.15) cathode materials for lithium-ion batteries," Dec. 29, 2011, Materials Research Bulletin, 47, 807-812. (Year: 2011).*

(Continued)

*Primary Examiner* — Ula C Ruddock
*Assistant Examiner* — Matthew W Van Oudenaren
(74) *Attorney, Agent, or Firm* — McDermott Will & Emery LLP (57) ABSTRACT

To provide a lithium-containing composite oxide, a cathode active material and a positive electrode for a lithium ion secondary battery, with which a lithium ion secondary battery having favorable cycle characteristics even when charged at a high voltage can be obtained; and a lithium ion secondary battery having favorable cycle characteristics (Continued)

even when charged at a high voltage. A lithium-containing composite oxide which is represented by $Li_aNi_bCo_cMn_dM_eO_2$ wherein M is Mg, Ca, Al, Ti, V, Nb, Mo, W or Zr, a+b+c+d+e=2, "a" is from 1.01 to 1.10, b is from 0.30 to 0.95, c is from 0 to 0.35, d is from 0 to 0.35, and e is from 0 to 0.05, wherein in an X-ray diffraction pattern obtained by reflection X-ray diffraction employing Cu-Kα rays, the ratio ($I_{104}/I_{110}$) of the integrated intensity ($I_{104}$) of a peak of (104) plane to the integrated intensity ($I_{110}$) of a peak of (110) plane is at least 4.20.

12 Claims, 6 Drawing Sheets

(51) Int. Cl.
　　*H01M 4/131* 　　(2010.01)
　　*H01M 4/505* 　　(2010.01)
　　*H01M 4/525* 　　(2010.01)
　　*H01M 4/02* 　　(2006.01)

(52) U.S. Cl.
　　CPC ........... *H01M 4/131* (2013.01); *H01M 4/505* (2013.01); *H01M 4/525* (2013.01); *C01P 2002/54* (2013.01); *C01P 2002/60* (2013.01); *C01P 2002/72* (2013.01); *C01P 2002/74* (2013.01); *C01P 2004/03* (2013.01); *C01P 2004/61* (2013.01); *H01M 2004/027* (2013.01); *H01M 2004/028* (2013.01)

(58) Field of Classification Search
　　CPC ...... H01M 2004/028; H01M 2004/021; C01G 53/50
　　See application file for complete search history.

(56) References Cited

U.S. PATENT DOCUMENTS

| 2016/0172672 | A1* | 6/2016 | Yuan | ..................... | H01M 4/505 |
| | | | | | 252/182.1 |
| 2016/0190575 | A1* | 6/2016 | Yu | ..................... | H01M 10/0525 |
| | | | | | 429/231.2 |
| 2018/0175384 | A1 | 6/2018 | Sugie et al. | | |

FOREIGN PATENT DOCUMENTS

| JP | 2006-344567 A | 12/2006 |
| JP | 2014-127235 A | 7/2014 |
| WO | 2014/115559 A1 | 7/2014 |

OTHER PUBLICATIONS

Notification of Transmittal of Translation of the International Preliminary Report on Patentability dated Aug. 16, 2018 in corresponding International Application No. PCT/JP2017/004000 (11 pages).
International Search Report dated Mar. 7, 2017 issued in International Patent Application No. PCT/JP2017/004000 (with English translation).
J. Liu, et al., Synthesis and electrochemical performance of Li1+x Ni0.5Mn0.3Co0.2O2+d (0<=x<=0.15) cathode materials for lithium-ion batteries, Materials Research Bulletin, Mar. 2012, vol. 47, No. 3, pp. 807-812.
N. Kumagai, et al., Impact of Excess Li on the Structural and Electrochemical Properties of Li 1+x (NizCo1-2zMnz)1-xO2 Materials for Lithium-Ion Batteries, Electrochemistry, 2010. 01.05, vol. 78, No. 1, pp. 23-29.

* cited by examiner

LITHIUM-CONTAINING COMPOSITE OXIDE, CATHODE ACTIVE MATERIAL, POSITIVE ELECTRODE FOR LITHIUM ION SECONDARY BATTERY, AND LITHIUM ION SECONDARY BATTERY

CROSS REFERENCE

This patent application is the U.S. National Phase under 35 U.S.C. § 371 of International Application No. PCT/JP2017/004000, filed on Feb. 3, 2017, which claims the benefit of Japanese Patent Application No. 2016-019044, filed on Feb. 3, 2016, the entire contents of each are hereby incorporated by reference.

TECHNICAL FIELD

The present invention relates to a lithium-containing composite oxide, a cathode active material, a positive electrode for a lithium ion secondary battery, and a lithium ion secondary battery.

BACKGROUND ART

A lithium ion secondary battery is required to be such that the energy per unit volume of a positive electrode (hereinafter sometimes referred to as the energy density) is high and that the discharge capacity will not be decreased by repeatedly carrying out a charge and discharge cycle (hereinafter sometimes referred to as the cycle characteristics).

As a cathode active material contained in a positive electrode of a lithium ion secondary battery, a lithium-containing composite oxide containing Ni, Co and Mn and having a crystal structure with space group R-3m has been known. For a lithium ion secondary battery using such a lithium-containing composite oxide, for the purpose of increasing the energy density of the lithium ion secondary battery, use at a high voltage of at least 4.5 V vs $Li^+/Li$ is required. However, if the lithium ion secondary battery using the lithium-containing composite oxide is charged at a high voltage, the cycle characteristics tend to be insufficient.

As a cathode active material and a positive electrode with which a lithium ion secondary battery having favorable cycle characteristics even when charged at a high voltage can be obtained, for example, the following (1) and (2) have been proposed.

(1) An active material represented by the formula of a layered rock salt structure: $Li_a Ni_b Co_c Mn_d D_e O_f$ ($0.2 \leq a \leq 1$, $b+c+d+e=1$, $0 \leq e \leq 1$, D is at least one element selected from Li, Fe, Cr, Cu, Zn, Ca, Mg, Zr, S, Si, Na, K and Al, $1.7 \leq f \leq 2.1$), which is a metal oxide containing at least Ni, Co and Mn, characterized by having in a surface layer a high manganese portion where the composition ratio of Ni, Co, and Mn is represented by Ni:Co:Mn=b2:c2:d2 (wherein $b2+c2+d2=1$, $0<b2<1$, $0<c2<c$, $d<d2<1$), and characterized in that the thickness $s_1$ (nm) of the layer at the high manganese portion is $0<s_1<20$ (excluding one with a continuous concentration gradient in the entire region from the center to the surface) (Patent Document 1).

(2) A positive electrode for a lithium ion secondary battery, which comprises a current collector and a cathode active material layer bound to the current collector, wherein the cathode active material layer comprises cathode active material particles containing a Li compound or solid solution selected from $Li_x Ni_a Co_b Mn_c O_2$, $Li_x Co_b Mn_c O_2$, $Li_x Ni_a Mn_c O_2$, $Li_x Ni_a Co_b O_2$ and $Li_2MnO_3$ (wherein $0.5 \leq x \leq 1.5$, $0.1 \leq a < 1$, $0.1 \leq b < 1$, $0.1 \leq c < 1$), a binding portion which binds the cathode active material particles and binds the cathode active material particles to the current collector, and an amorphous boron oxide coating layer covering at least a part of the surface of the cathode active material particles (Patent Document 2).

PRIOR ART DOCUMENTS

Patent Documents

Patent Document 1: WO2014/115559
Patent Document 2: JP-A-2014-127235

DISCLOSURE OF INVENTION

Technical Problem

Of each of the above cathode active material (1) and the positive electrode (2), the durability of the cathode active material against charging at a high voltage is improved by providing a covering (the surface layer at the high manganese portion or the boron oxide coating layer) on the surface of the lithium-containing composite oxide. However, of each of the cathode active material (1) and the positive electrode (2), the durability against charging at a high voltage of the interior lithium-containing composite oxide itself is not improved. Accordingly, a lithium ion secondary battery employing the cathode active material (1) or the positive electrode (2) does not necessarily have sufficient cycle characteristics when charged at a high voltage.

The object of the present invention is to provide a lithium-containing composite oxide, a cathode active material and a positive electrode for a lithium ion secondary battery, with which a lithium ion secondary battery having favorable cycle characteristics even when charged at a high voltage can be obtained; and a lithium ion secondary battery having favorable cycle characteristic even when charged at a high voltage.

Solution to Problem

The present invention provides the following embodiments.

[1] A lithium-containing composite oxide which is represented by the following formula (I):

$$Li_a Ni_b Co_c Mn_d M_e O_2 \qquad \text{formula (I)}$$

wherein M is at least one member selected from the group consisting of Mg, Ca, Al, Ti, V, Nb, Mo, W and Zr, $a+b+c+d+e=2$, "a" is from 1.01 to 1.10, b is from 0.30 to 0.95, c is from 0 to 0.35, d is from 0 to 0.35, and e is from 0 to 0.05, wherein in an X-ray diffraction pattern obtained by reflection X-ray diffraction employing Cu-Kα rays, the ratio ($I_{104}/I_{110}$) of the integrated intensity ($I_{104}$) of a peak of (104) plane assigned to a crystal structure with space group R-3m to the integrated intensity (Ho) of a peak of (110) plane assigned to a crystal structure with space group R-3m is at least 4.20.

[2] The lithium-containing composite oxide according to [1], wherein with respect to the ratio ($I_{003}/I_{104}$) of the integrated intensity ($I_{003}$) of a peak of (003) plane assigned to a crystal structure with space group R-3m to the integrated intensity ($I_{104}$) of a peak of (104) plane assigned to a crystal structure with space group R-3m in an X-ray diffraction pattern of the lithium-containing composite oxide, the value obtained by dividing the above ratio obtained by reflection X-ray diffraction employing Cu-Kα rays, by the above ratio obtained by transmission X-ray diffraction employing synchrotron radiation, is at least 1.18.

[3] The lithium-containing composite oxide according to [1] or [2], wherein with respect to the ratio ($I_{003}/I_{104}$) of the integrated intensity ($I_{003}$) of a peak of (003) plane assigned to a crystal structure with space group R-3m to the integrated intensity ($I_{104}$) of a peak of (104) plane assigned to a crystal structure with space group R-3m in an X-ray diffraction pattern of the lithium-containing composite oxide, the value obtained by subtracting the above ratio obtained by transmission X-ray diffraction employing synchrotron radiation, from the above ratio obtained by reflection X-ray diffraction employing Cu-Kα rays, is at least 0.18.

[4] The lithium-containing composite oxide according to any one of [1] to [3], wherein in the formula (I), a+b+c+d+e=2, "a" is from 1.01 to 1.10, b is from 0.40 to 0.55, c is from 0.15 to 0.35, d is from 0.20 to 0.35, and e is from 0 to 0.05.

[5] The lithium-containing composite oxide according to any one of [1] to [4], wherein in an X-ray diffraction pattern of the lithium-containing composite oxide obtained by reflection X-ray diffraction employing CuKα rays, the crystallite size obtained in accordance with the Scherrer equation from a peak of (110) plane assigned to a crystal structure with space group R-3m is from 30 to 70 nm.

[6] A cathode active material containing the lithium-containing composite oxide as defined in any one of [1] to [5].

[7] The cathode active material according to [6], wherein $D_{50}$ of the cathode active material is from 3 to 15 μm.

[8] A positive electrode for a lithium ion secondary battery, which comprises the cathode active material as defined in [6] or [7], an electrically conductive material and a binder.

[9] A lithium ion secondary battery, which comprises the positive electrode for a lithium ion secondary battery as defined in [8], a negative electrode, a separator and a non-aqueous electrolyte.

Advantageous Effects of Invention

According to the lithium-containing composite oxide of the present invention, it is possible to obtain a lithium ion secondary battery having favorable cycle characteristics even when charged at a high voltage. According to the cathode active material of the present invention, it is possible to obtain a lithium ion secondary battery having favorable cycle characteristics even when charged at a high voltage. According to the positive electrode for a lithium ion secondary battery of the present invention, it is possible to obtain a lithium ion secondary battery having favorable cycle characteristics even when charged at a high voltage. The lithium ion secondary battery of the present invention has favorable cycle characteristics even when charged at a high voltage.

DESCRIPTION OF EMBODIMENTS

The following definitions of terms are applied to this specification including Claims.

The "$D_{50}$" is a particle size at a point of 50% on a cumulative volume distribution curve which is drawn by obtaining the particle size distribution on the volume basis and taking the whole to be 100%, that is, a volume-based cumulative 50% size.

The "particle size distribution" is obtained from the frequency distribution and cumulative volume distribution curve measured by means of a laser scattering particle size distribution measuring apparatus (for example, a laser diffraction/scattering type particle size distribution measuring apparatus). The measurement is carried out by sufficiently dispersing the powder in an aqueous medium by e.g. ultrasonic treatment.

The "crystallite size" is obtained in accordance with the following Scherrer equation from the diffraction angle 2θ (deg) and the half value width B (rad) of a peak of specific (abc) plane in an X-ray diffraction pattern obtained by reflection X-ray diffraction employing Cu-Kα rays (hereinafter sometimes referred to simply as a reflection X-ray diffraction pattern):

$$D_{abc}=(0.9\lambda)/(B \cos \theta)$$

wherein $D_{abc}$ is the crystallite size of (abc) plane, and A is the wavelength of X-rays.

The "specific surface area" is a value measured by a BET (Brunauer, Emmet, Teller) method. In the measurement of the specific surface area, nitrogen gas is used as an adsorption gas.

The expression "Li" means a Li element, not a Li metal simple substance, unless otherwise specified. The same applies to expressions of other elements such as Ni, Co, Mn, etc.

The composition analysis of a lithium-containing composite oxide is carried out by inductively-coupled plasma spectrometry (hereinafter referred to as ICP). Further, the ratio of elements in a lithium-containing composite oxide is a value with respect to the lithium-containing composite oxide before initial charging (also called activation treatment).

<Lithium-Containing Composite Oxide>

The lithium-containing composite oxide of the present invention is a compound represented by the following formula (I) (hereinafter sometimes referred to as "composite oxide (I)").

$$Li_aNi_bCo_cMn_dM_eO_2 \qquad \text{formula (I)}$$

wherein (a+b+c+d+e) which is the total of a, b, c, d and e is 2.

"a" is the number of moles of Li contained in the composite oxide (I). "a" is from 1.01 to 1.10, preferably from 1.01 to 1.05, more preferably from 1.02 to 1.04. When "a" is within the above range, the discharge capacity of a lithium ion secondary battery having the composite oxide (I) can be made high, and the cycle characteristics tend to be favorable.

b is the number of moles of Ni contained in the composite oxide (I). b is from 0.30 to 0.95, preferably from 0.40 to 0.55, more preferably from 0.40 to 0.50, still more preferably from 0.42 to 0.45. When b is within the above range, the discharge capacity of a lithium ion secondary battery having the composite oxide (I) can be made high, and the cycle characteristics tend to be favorable.

c is the number of moles of Co contained in the composite oxide (I). c is from 0 to 0.35, preferably from 0.15 to 0.35, more preferably from 0.15 to 0.30, still more preferably from 0.25 to 0.30. When c is within the above range, the discharge capacity of a lithium ion secondary battery having the composite oxide (I) can be made high, and the output characteristics tend to be favorable.

d is the number of moles of Mn contained in the composite oxide (I). d is from 0 to 0.35, preferably from 0.20 to 0.35, more preferably from 0.20 to 0.30, still more preferably from 0.20 to 0.25. When d is within the above range, the discharge capacity of a lithium ion secondary battery having the composite oxide (I) can be made high, and the cycle characteristics tend to be favorable.

The composite oxide (I) may contain other metal element M, as the case requires. Such other metal element M is at least one member selected from the group consisting of Mg, Ca, Al, Ti, V, Nb, Mo, W and Zr. M is preferably at least one member selected from the group consisting of Zr, Al, Ti and W since the discharge capacity of a lithium ion secondary battery having the composite oxide (I) is easily made high, and the cycle characteristics are easily made favorable.

e is the number of moles of M contained in the composite oxide (I). e is from 0 to 0.05, preferably from 0 to 0.01, more preferably from 0 to 0.007.

The composite oxide (I) has a layered rock salt crystal structure with space group R-3m. The composite oxide (I) having such a crystal structure is confirmed by X-ray diffraction measurement.

X-ray diffraction measurement is carried out by the method under the conditions as described in Examples. A peak of (110) plane assigned to a crystal structure with space group R-3m is a peak which appears at 2θ=64 to 66 deg when Cu-Kα rays are employed. A peak of (104) plane assigned to a crystal structure with space group R-3m is a peak which appears at 2θ=43 to 46 deg when Cu-Kα rays are employed. A peak of (003) plane assigned to a crystal structure with space group R-3m is a peak which appears at 2θ=18 to 20 deg when Cu-Kα rays are employed.

The present inventors have found that in a composite oxide (I) comprising secondary particles having a plurality of primary particles agglomerated, there is a relation between the orientation of crystallites having a layered rock salt crystal structure with space group R-3m constituting the primary particles, and the durability of the composite oxide (I) against charging at a high voltage, and accomplished the present invention.

That is, when the amount of primary particles of which the c-axis direction of the crystallite intersects with the surface of the secondary particle is large, in other words, when the amount of primary particles of which the c-axis direction of the crystallite is in parallel with the surface of the secondary particle is small, the composite oxide (I) comprising the secondary particles is hardly broken even when charge and discharge are repeatedly carried out at a high voltage. As a result, it has been found that the cycle characteristics when charged at a high voltage are improved.

The proportion of the primary particles of which the c-axis direction of the crystallite intersects with the surface of the secondary particle may be estimated from the integrated intensity ($I_{1\,0\,4}$) of a peak of a plane of a crystallite which interacts with the c-axis, that is, (104) plane assigned to a crystal structure with space group R-3m in a reflection X-ray diffraction pattern. Further, the proportion of primary particles of which the c-axis direction of the crystallite is in parallel with the surface of the secondary particle, may be estimated from the integrated intensity ($I_{1\,1\,0}$) of a peak of a plane of a crystallite in parallel with the c-axis, that is, (110) plane assigned to a crystal structure with space group R-3m in a reflection X-ray diffraction pattern.

Accordingly, the durability of the composite oxide (I) against charging at a high voltage tends to be favorable when the ratio ($I_{1\,0\,4}/I_{1\,1\,0}$) of the integrated intensity ($I_{1\,0\,4}$) of a peak of (104) plane assigned to a crystal structure with space group R-3m to the integrated intensity ($I_{1\,1\,0}$) of a peak of (110) plane assigned to a crystal structure with space group R-3m, in a reflection X-ray diffraction pattern of the composite oxide (I), is high.

$I_{1\,0\,4}/I_{1\,1\,0}$ in a reflection X-ray diffraction pattern of the composite oxide (I) is at least 4.20, preferably from 4.20 to 5.00, more preferably from 4.25 to 4.50, still more preferably from 4.27 to 4.50. When $I_{1\,0\,4}/I_{1\,1\,0}$ is at least the lower limit value of the above range, the durability of the composite oxide (I) against charging at a high voltage tends to be high, and the cycle characteristics of the obtainable lithium ion secondary battery against charging at a high voltage tend to be favorable. When $I_{1\,0\,4}/I_{1\,1\,0}$ is at most the upper limit value of the above range, the composite oxide (I) can be produced without extremely raising the firing temperature in the after-mentioned step (b).

In the present invention, with respect to the ratio ($I_{0\,0\,3}/I_{1\,0\,4}$) of the integrated intensity ($I_{0\,0\,3}$) of a peak of (003) plane assigned to a crystal structure with space group R-3m to the integrated intensity ($I_{1\,0\,4}$) of a peak of (104) plane assigned to a crystal structure with space group R-3m in an X-ray diffraction pattern of the composite oxide (I), the value obtained by dividing the above ratio obtained by reflection X-ray diffraction employing Cu-Kα rays, by the above ratio obtained by transmission X-ray diffraction employing synchrotron radiation, is preferably at least 1.18.

The reflection X-ray diffraction is easily influenced by orientation of particles, and the transmission X-ray diffraction is less likely to be influenced by orientation of the particles. Accordingly, from the ratio of the above $I_{003}/I_{104}$ values obtained by the respective X-diffraction measurements, the proportion of primary particles of which the c-axis direction of the crystallite intersects with the surface of the secondary particle, can be compared. And, when the ratio of the values is at least 1.18, the cycle characteristics tend to be high when charged at a high voltage. The ratio of the values is more preferably at least 1.19, more preferably at least 1.2. On the other hand, the ratio of the values is preferably at most 1.5, more preferably at most 1.4, still more preferably at most 1.3.

In the present invention, with respect to the ratio $(I_{003}/I_{104})$ of the integrated intensity $(I_{003})$ of a peak of (003) plane assigned to a crystal structure with space group R-3m to the integrated intensity $(I_{104})$ of a peak of (104) plane assigned to a crystal structure with space group R-3m in an X-ray diffraction pattern of the composite oxide (I), the value obtained by subtracting the above ratio obtained by transmission X-ray diffraction employing synchrotron radiation, from the above ratio obtained by reflection X-ray diffraction employing Cu-Kα rays, is preferably at least 0.18. The reflection X-ray diffraction is likely to be influenced by orientation of particles, and the transmission X-ray diffraction is less likely to be influenced by orientation of particles. Accordingly, also from the difference between the respective $I_{003}/I_{104}$ values, the proportion of primary particles of which the c-axis direction of the crystallite intersects with the surface of the secondary particle, can be compared. And, when the difference between these values is at least 0.18, the cycle characteristics tend to be high when charged at a high voltage. The difference between the values is more preferably at least 0.19, still more preferably at least 0.2. On the other hand, the difference between the values is preferably at most 0.4, more preferably at most 0.35, still more preferably at most 0.33.

$I_{003}/I_{104}$ obtained by reflection X-ray diffraction employing Cu-Kα rays and $I_{003}/I_{104}$ obtained by transmission X-ray diffraction employing synchrotron radiation, of the composite oxide (I), are respectively values measured by the methods disclosed in Examples.

The crystallite size $(D_{110})$ obtained by the Scherrer equation from a peak of (110) plane assigned to a crystal structure with space group R-3m in a reflection X-ray diffraction pattern of the composite oxide (I), is preferably from 30 to 70 nm, more preferably from 30 to 65 nm, still more preferably from 40 to 65 nm. When $D_{110}$ is at least the lower limit value of the above range, the stability of the crystal structure will improve. When $D_{110}$ is at most the upper limit value of the above range, the cycle characteristics of the resulting lithium ion secondary battery tend to be favorable.

(Process for Producing Composite Oxide (I))

The composite oxide (I) is obtained by mixing a transition metal-containing compound essentially containing Ni, Co and Mn and optionally containing M with a lithium compound and firing the obtained mixture.

As one embodiment of the process for producing the composite oxide (I), a process comprising the following steps (a) and (b) may, for example, be mentioned.

(a) A step of obtaining a transition metal-containing compound essentially containing Ni, Co and Mn and optionally containing M.

(b) A step of mixing the transition metal-containing compound and a lithium compound, and firing the obtained mixture to obtain a lithium-containing composite oxide.

Step (a):

In a case where the transition metal-containing compound contains M, the ratio of Ni, Co, Mn and M contained in the transition metal-containing compound is preferably the same as the ratio of Ni, Co, Mn and M contained in the composite oxide (I).

In a case where the transition metal-containing compound contains no M, and in the step (b), a compound containing M is further mixed, the ratio of Ni, Co and Mn contained in the transition metal-containing compound is preferably the same as the ratio of Ni, Co and Mn contained in the composite oxide (I).

M is the same as M contained in the composite oxide (I).

The transition metal-containing compound may, for example, be a hydroxide or a carbonate, and is preferably the hydroxide with a view to efficiently producing the composite oxide (I). In the present invention, the hydroxide includes an oxyhydroxide which is partially oxidized.

The hydroxide may, for example, be prepared by an alkali coprecipitation method.

The alkali coprecipitation method is a method wherein an aqueous metal salt solution essentially containing Ni, Co and Mn and optionally containing M and a pH adjusting liquid containing a strong alkali are continuously supplied to a reactor and mixed, and while keeping the pH in the mixture constant, a hydroxide essentially containing Ni, Co and Mn and optionally containing M is precipitated.

The metal salt may, for example, be a nitrate, an acetate, a chloride or a sulfate of each metal element, and a sulfate is preferred, since the material cost is relatively low, and excellent battery characteristics are thereby obtainable. As the metal salt, a sulfate of Ni, a sulfate of Mn and a sulfate of Co are more preferred.

The sulfate of Ni may, for example, be nickel(II) sulfate hexahydrate, nickel(II) sulfate heptahydrate or nickel(II) ammonium sulfate hexahydrate.

The sulfate of Co may, for example, be cobalt(II) sulfate heptahydrate or cobalt(II) ammonium sulfate hexahydrate.

The sulfate of Mn may, for example, be manganese(II) sulfate pentahydrate or manganese(II) ammonium sulfate hexahydrate.

The aqueous metal salt solution may contain an aqueous medium other than water.

The aqueous medium other than water, may, for example, be methanol, ethanol, 1-propanol, 2-propanol, ethylene glycol, propylene glycol, diethylene glycol, dipropylene glycol, polyethylene glycol, butanediol or glycerine. The proportion of the aqueous medium other than water is preferably from 0 to 20 parts by mass, more preferably from 0 to 10 parts by mass, particularly preferably from 0 to 1 part by mass, per 100 parts by mass of water from the viewpoint of safety, environmental aspect, handling efficiency and costs.

The pH adjusting liquid is preferably an aqueous solution containing a strong alkali.

The strong alkali is preferably at least one member selected from the group consisting of sodium hydroxide, potassium hydroxide and lithium hydroxide.

To the mixed liquid, a complexing agent may be added to adjust the solubility of the metal element. A complexing agent is to form a complex with Ni, Co and Mn. The complexing agent is preferably ammonia, ammonium sulfate, ammonium bicarbonate, ammonium hydrogencarbonate or the like. In order to reduce the difference in solubility between Ni, Co and Mn, the amount of supply of the complexing agent is, by the molar ratio based on the total molar amount of Ni, Co and Mn, preferably from 0.01 to 10, more preferably from 0.1 to 1.

As a method for producing the hydroxide, preferred is a method of preparing nuclei of a coprecipitate in a first reactor, transferring the nuclei to a second reactor, and subjecting the nuclei to particle growth in the second reactor. Of a composite oxide (I) prepared by using a hydroxide obtained by such a production method, $I_{104}/I_{110}$ is within the range of the present invention. In the method for producing the precursor, in addition to the above steps, another step may properly be carried out as the case requires.

In the first reactor, the aqueous metal salt solution containing Ni, Co and Mn and the pH adjusting liquid containing a strong alkali are continuously supplied to prepare nuclei of the coprecipitate. In the first reactor, water may preliminarily be put before the aqueous metal salt solution and the pH adjusting liquid are supplied. As a method of continuously supplying the aqueous metal salt solution and the pH adjusting liquid to the first reactor, a dropping method or a method of pumping them from piping inserted to the reaction solution may, for example, be mentioned. When the aqueous metal salt solution and the pH adjusting liquid are supplied, the reaction solution is preferably stirred, and the reaction solution is preferably bubbled with e.g. a nitrogen gas.

In the first reactor, it is preferred to allow a slurry containing the nuclei to overflow from an overflow port while the aqueous metal salt solution and the pH adjusting liquid are supplied, whereby the solid content concentration in the first reactor may be maintained to such an extent that agglomeration of the nuclei is suppressed, and growth of the nuclei in the first reactor may be suppressed.

While the aqueous metal salt solution is supplied to the first reactor, the pH of the reaction solution in the first reactor is preferably maintained to be from 11 to 13.5. When the pH of the reaction solation is maintained to be from 11 to 13.5, the metal salt and the strong alkali are quickly reacted with each other, whereby formation of the nuclei is dominant over growth of the nuclei. The pH of the reaction solution is more preferably from 12 to 13. The pH of the reaction solution may be adjusted by the supply rate of the pH adjusting liquid. Further, in the first reactor, the temperature of the reaction solution is preferably from 45 to 70° C.

In the first reactor, a complexing agent is preferably supplied continuously, whereby the difference in the solubility between the metals Ni, Co and Mn can be reduced and as a result, nuclei of a coprecipitate having a uniform metal composition can be prepared.

The nuclei obtained in the first reactor are transferred to the second reactor. As a method of transferring the nuclei, a method of transferring the overflowing slurry containing the nuclei from the first reactor to the second reactor, a method of transferring the overflowing slurry to a separate container and transferring the slurry from the container to the second reactor, or a method of transferring the slurry containing the nuclei through piping provided at the upper portion of the first reactor to the second reactor may, for example, be mentioned. Among them, preferred is the method of transferring the overflowing slurry containing the nuclei from the first reactor to the second reactor, which is simple.

In the second reactor, the aqueous metal salt solution and the pH adjusting liquid are continuously supplied to grow the nuclei to prepare the hydroxide. The method of supplying the aqueous metal salt solution and the pH adjusting liquid can be the same as in the case of the first reactor.

To the second reactor, it is preferred to continuously supply the complexing agent while the aqueous metal salt solution and the pH adjusting liquid are supplied.

In the second reactor, it is preferred to remove the supernatant liquid through e.g. filter cloth from the overflow port while the aqueous metal salt solution and the pH adjusting liquid are supplied, whereby the solid content concentration in the second reactor can be increased, and growth of the nuclei and particles grown from the nuclei is dominant over formation of the nuclei. As a result, growth of the particles tends to be uniform, and a hydroxide with high sphericity and with a narrow particle size distribution can be obtained.

While the nuclei are grown, the pH of the reaction solution in the second reactor is preferably maintained to be from 9 to 11.5. When the pH of the reaction solution is maintained within such a range, growth of the nuclei is likely to proceed. The pH of the reaction solution is more preferably maintained to be from 9.5 to 10.5. The temperature of the reaction solution in the second reactor is preferably from 20 to 40° C. The time for which the nuclei are made to grow in the second reactor is not particularly limited and is properly selected depending upon the desired size of the particles.

The hydroxide obtained in the second reactor is preferably collected by filtration and then washed with water, whereby impurities can be removed from the hydroxide obtained by the coprecipitation method. The hydroxide is preferably dried after washed with water. The drying temperature is preferably from 80 to 140° C., however, the drying time is not particularly limited so long as the water content can be removed.

The specific surface area of the hydroxide is preferably from 1 to 50 m$^2$/g, more preferably from 2 to 20 m$^2$/g. When the specific surface area of the hydroxide is within the above range, the specific surface area of the resulting cathode active material can be easily controlled to be within a preferred range. Here, the specific surface area of the hydroxide is a value measured after the hydroxide is dried at 120° C. for 12 hours.

$D_{50}$ of the hydroxide is preferably from 3 to 15 μm, more preferably from 3 to 12 μm, still more preferably from 3 to 10 μm. When $D_{50}$ of the hydroxide is within the above range, $D_{50}$ of the cathode active material can be easily controlled to be within a preferred range.

The hydroxide is preferably one such that in a reflection X-ray diffraction pattern of an oxide obtained by firing the hydroxide at 900° C. for 8 hours, the ratio ($I_{2\,2\,2}/I_{4\,0\,0}$) of the integrated intensity ($I_{2\,2\,2}$) of a peak of (222) plane assigned to a crystal structure with space group Fd-3m to the integrated intensity ($I_{4\,0\,0}$) of a peak of (400) plane assigned to a crystal structure with space group Fd-3m is from 0.310 to 0.350, more preferably from 0.313 to 0.330, still more preferably from 0.313 to 3.25. By using a hydroxide such that $I_{2\,2\,2}/I_{4\,0\,0}$ of the oxide is within the above range, a composite oxide (I) such that $I_{1\,0\,4}/I_{1\,1\,0}$ is within the above range is likely to be obtained.

X-ray diffraction measurement is carried out by the method under the conditions as described in Examples. The peak of (400) plane assigned to a crystal structure with space group Fd-3m is a peak which appears at 2θ=37.5 to 38.0 deg when Cu-Kα rays are employed. The peak of (222) plane assigned to a crystal structure with space group Fd-3m is a peak which appears at 2θ=43.5 to 44.0 deg when Cu-Kα rays are employed.

Step (b):

The transition metal-containing compound and a lithium compound are mixed, and the obtained mixture is fired, whereby a lithium-containing composite oxide will be formed. To the mixture, a compound containing M may be further mixed.

The lithium compound is preferably one member selected from the group consisting of lithium carbonate, lithium hydroxide and lithium nitrate. Lithium carbonate is more preferred from the viewpoint of handling efficiency in the production step.

The mixing ratio of the lithium compound to the hydroxide is preferably a mixing ratio such that the ratio of the molar amount of Li contained in the lithium compound to the total molar amount of Ni, Co, Mn and M contained in the hydroxide will be from 1.02 to 1.22.

In a case where the transition metal-containing compound contains M, the ratio of Ni, Co, Mn and M contained in the mixture is preferably the same as the ratio of Ni, Co, Mn and M contained in the composite oxide (I).

In a case where the transition metal-containing compound contains no M, and a compound containing M is further mixed to the mixture, the ratio of Ni, Co, Mn and M contained in the mixture after mixing the compound containing M is preferably the same as the ratio of Ni, Co, Mn and M contained in the composite oxide (I).

The compound containing M is preferably at least one member selected from the group consisting of an oxide of M, a hydroxide of M, a carbonate of M, a nitrate of M, an acetate of M, and an organic compound. In the case of such a compound, in the step (b), impurities evaporate, and the impurities tend not to remain in the composite oxide (I).

The method for mixing the transition metal-containing compound and the lithium compound may, for example, be a method of using a rocking mixer, a Nauta mixer, a spiral mixer, a cutter mill or a V mixer.

The firing apparatus may, for example, be an electric furnace, a continuous firing furnace or a rotary kiln.

During the firing, the transition metal-containing compound is oxidized, and therefore, the firing is preferably conducted in the atmospheric air, and it is particularly preferably conducted while air is supplied.

The supply rate of air is preferably from 10 to 200 mL/min., more preferably from 40 to 150 mL/min., per 1 L of the inner volume of the furnace.

By supplying air during the firing, the metal elements in the transition metal-containing compound will be sufficiently oxidized, whereby it is possible to obtain the composite oxide (I) having a high crystallinity and having a crystal structure with space group R-3m.

The firing temperature is preferably from 800 to 970° C., more preferably from 810 to 960° C., still more preferably from 870 to 940° C. The firing temperature is not the set temperature of a firing furnace but is a value indicated by universal thermal history sensors (Referthermo, manufactured by Japan Fine Ceramics Center) or a value indicated by a thermocouple in the vicinity of the mixture. When the firing temperature is at least the lower limit value of the above range, the discharge capacity of a lithium ion secondary battery having the composite oxide (I) tends to be high. When the firing temperature is at most the upper limit value of the above range, the cycle characteristics of a lithium ion secondary battery having the composite oxide (I) tend to be favorable. The firing time is preferably from 4 to 40 hours, more preferably from 4 to 20 hours.

The above-described composite oxide (I), which is a lithium-containing composite oxide represented by the formula (I), and of which $I_{1\,0\,4}/I_{1\,1\,0}$ in a reflection X-ray diffraction pattern is at least 4.20, is hardly broken or cracked even when repeatedly subjected to a charge and discharge cycle at a high voltage. Accordingly, it is possible to obtain a lithium ion secondary battery having favorable cycle characteristics even when charged at a high voltage.

<Cathode Active Material>

The cathode active material of the present invention (hereinafter sometimes referred to as "the present cathode active material") may be the composite oxide (I) as it is or the composite oxide (I) which has a covering on its surface.

With the present cathode active material having a covering on the surface of the composite oxide (I), the cycle characteristics of a lithium ion secondary battery can be easily made favorable.

The covering may, for example, be a compound containing at least one member selected from the group consisting of Zr, Ti, Al and F. The compound containing at least one member selected from the group consisting of Zr, Ti and Al may, for example, be an oxide, a sulfate or a carbonate containing such an element. The compound containing F may, for example, be lithium fluoride or ammonium fluoride.

The covering may be present on a surface of the composite oxide (I), and the covering may be present on the entire surface of the composite oxide (I) or may be present on a part of the composite oxide (I).

The total content of Zr, Ti, Al and F in the covering is preferably at least 0.01 mol %, more preferably at least 0.1 mol %, particularly preferably at least 0.2 mol % based on the content (100 mol %) of the metals (excluding Li) in the composite oxide (I). The total content of Zr, Ti, Al and F in the covering is preferably at most 5 mol %, more preferably at most 1 mol %, particularly preferably at most 0.6 mol %, based on the content (100 mol %) of the metals (excluding Li) in the composite oxide (I).

Formation of the covering may, for example, be carried out by spraying a coating liquid containing at least one member selected from the group consisting of Zr, Ti, Al and F to the composite oxide (I), followed by firing to remove a solvent of the coating liquid, or carried out by dipping the composite oxide (I) in a coating liquid, followed by solid-liquid separation by filtration and firing to remove a solvent.

The present cathode active material is preferably in the form of secondary particles in which a plurality of primary particles are aggregated.

$D_{50}$ of the secondary particles of the present cathode active material is preferably from 3 to 15 μm, more preferably from 3 to 12 μm, still more preferably from 3 to 10 μm. When $D_{50}$ is within the above range, the discharge capacity of the lithium ion battery can easily be made high.

The specific surface are of the present cathode active material is preferably from 0.1 to 3.0 m$^2$/g, more preferably from 0.2 to 1.5 m$^2$/g, still more preferably from 0.3 to 0.9 m$^2$/g. When the specific surface area is at least the lower limit value of the above range, the discharge capacity of the lithium ion secondary battery can be easily made high. When the specific surface are is at most the upper limit of the above range, the cycle characteristics of the lithium ion secondary battery can be easily made favorable.

The above-described present cathode active material comprises the composite oxide (I), whereby it is possible to obtain a lithium ion secondary battery having favorable cycle characteristics even when charged at a high voltage.

<Positive Electrode for Lithium Ion Secondary Battery>

The positive electrode for a lithium ion secondary battery of the present invention (hereinafter referred to as the present positive electrode) comprises the present cathode active material. Specifically, it has a cathode active material layer comprising the present active material, an electrically conductive material and a binder, formed on a positive electrode current collector.

As the electrically conductive material, carbon black (such as acetylene black or Ketjen black), graphite, vapor-grown carbon fibers or carbon nanotubes may, for example, be mentioned.

As the binder, a fluorinated resin (such as polyvinylidene fluoride or polytetrafluoroethylene), a polyolefin (such as polyethylene or polypropylene), a polymer or copolymer having unsaturated bonds (such as a styrene/butadiene rubber, an isoprene rubber or a butadiene rubber) or an acrylic polymer or copolymer (such as an acrylic copolymer or a methacrylic copolymer) may, for example, be mentioned.

As the positive electrode current collector, an aluminum foil or a stainless steel foil may, for example, be mentioned.

The present positive electrode may be produced, for example, by the following method.

The present cathode active material, the electrically conductive material and the binder are dissolved or dispersed in a medium to obtain a slurry. The obtained slurry is applied to the positive electrode current collector, and the medium is removed e.g. by drying to form a cathode active material layer. As the case requires, the cathode active material layer may be pressed e.g. by roll pressing. The present positive electrode is obtained in such a manner.

Otherwise, the present cathode active material, the electrically conductive material and the binder are kneaded with a medium to obtain a kneaded product. The obtained kneaded product is pressed on the positive electrode current collector to obtain the present positive electrode.

The above-described present positive electrode contains the present cathode active material, whereby it is possible to obtain a lithium ion secondary battery having favorable cycle characteristics even when charged at a high voltage.

<Lithium Ion Secondary Battery>

The lithium ion secondary battery of the present invention (hereinafter referred to as the present battery) has the present positive electrode. Specifically, it comprises the present positive electrode, a negative electrode, a separator and a non-aqueous electrolyte.

(Negative Electrode)

The negative electrode contains an anode active material. Specifically, it has an anode active material layer containing an anode active material and as the case requires an electrically conductive material and a binder, formed on a negative electrode current collector.

The anode active material may be any material so long as it is capable of absorbing and desorbing lithium ions at a relatively low potential. The anode active material may, for example, be a lithium metal, a lithium alloy, a lithium compound, a carbon material, an oxide composed mainly of a metal in Group 14 of the periodic table, an oxide composed mainly of a metal in Group 15 of the periodic table, a carbon compound, a silicon carbide compound, a silicon oxide compound, titanium sulfide or a boron carbide compound.

The carbon material as the anode active material may, for example, be non-graphitized carbon, artificial graphite, natural graphite, thermally decomposed carbon, cokes (such as pitch coke, needle coke or petroleum coke), graphites, glassy carbons, an organic polymer compound fired product (product obtained by firing and carbonizing a phenol resin, a furan resin or the like at an appropriate temperature), carbon fibers, activated carbon or carbon blacks.

The metal in Group 14 of the periodic table to be used as the anode active material may be Si or Sn, and is preferably Si. As another anode active material, an oxide such as iron oxide, ruthenium oxide, molybdenum oxide, tungsten oxide, titanium oxide or tin oxide, or a nitride may, for example, be mentioned.

As the electrically conductive material and the binder for the negative electrode, the same ones as for the positive electrode may be used. As the negative electrode current collector, a metal foil such as a nickel foil or a copper foil may be mentioned.

The negative electrode may be produced, for example, by the following method.

The anode active material, the electrically conductive material and the binder are dissolved or dispersed in a medium to obtain a slurry. The obtained slurry is applied to the negative electrode current collector, and the medium is removed e.g. by drying, followed by pressing to obtain the negative electrode.

(Non-Aqueous Electrolyte)

The non-aqueous electrolyte may, for example, be a non-aqueous electrolytic solution having an electrolyte salt dissolved in an organic solvent.

The organic solvent may be an organic solvent known for a non-aqueous electrolytic solution. Specifically, it may, for example, be propylene carbonate, ethylene carbonate, diethyl carbonate, dimethyl carbonate, 1,2-dimethoxyethane, 1,2-diethoxyethane, γ-butyrolactone, diethyl ether, sulfolane, methyl sulfolane, acetonitrile, an acetic acid ester, a butyric acid ester or a propionic acid ester. In view of the voltage stability, preferred is a cyclic carbonate (such as propylene carbonate) or a chain-structured carbonate (such as dimethyl carbonate or diethyl carbonate). As the organic solvent, one type may be used alone, or two or more types may be used in combination.

As the electrolyte salt, any one of those commonly used for a lithium ion secondary battery may be used. The electrolyte salt may, for example, be $LiClO_4$, $LiPF_6$, $LiBF_4$ or $CH_3SO_3Li$.

Between the positive electrode and the negative electrode, a separator may be interposed so as to prevent short-circuiting. As the separator, a porous film may be mentioned. The porous film is used as impregnated with the non-aqueous electrolytic solution. Further, the porous film impregnated with the non-aqueous electrolytic solution, followed by gelation, may be used as a gelled electrolyte.

As a material of a battery exterior package, nickel-plated iron, stainless steel, aluminum or its alloy, nickel, titanium, a resin material or a film material may, for example, be mentioned.

The shape of the lithium ion secondary battery may, for example, be a coin-shape, a sheet-form (film-form), a folded shape, a wound cylinder with bottom, or a button shape, and is suitably selected depending upon the intended use.

The above-described present battery has the present positive electrode, whereby it is possible to obtain a lithium ion secondary battery having favorable cycle characteristics even when charged at a high voltage.

EXAMPLES

Now, the present invention will be described in detail with reference to Examples, but it should be understood that the present invention is by no means thereby restricted.

Ex. 1 to 15 are Examples of the present invention, and Ex. 16 to 21 are Comparative Examples.

(Compositional Analysis)

The compositional analysis of each of the hydroxide and the lithium-containing composite oxide was carried out by means of inductively coupled plasma (ICP).

(Reflection X-Ray Diffraction)

Reflection X-ray diffraction measurement of each of the oxide obtained by firing the hydroxide at 900° C. for 8 hours, and the lithium-containing composite oxide, was carried out by an X-ray diffraction apparatus (manufactured by Rigaku Corporation, apparatus name: SmartLab). The measurement conditions are shown in Table 1. Measurement was carried out at 25° C. With respect to measurement of the lithium-containing composite oxide, before the measurement, 1 g of the oxide or the lithium-containing composite oxide and 10 mg of an X-ray diffraction standard sample 640d were mixed in an agate mortar and the mixture was used as a measurement sample.

With respect to the obtained reflection X-ray diffraction pattern, peak search was carried out using integrated powder X-ray diffraction software PDXL2 manufactured by Rigaku Corporation. From the respective peaks, $I_{2\ 2\ 2}/I_{4\ 0\ 0}$ of the oxide, and $D_{1\ 1\ 0}$, $I_{1\ 0\ 4}/I_{1\ 1\ 0}$ and $I_{0\ 0\ 3}/I_{1\ 0\ 4}$ of the lithium-containing composite oxide were obtained.

TABLE 1

| Apparatus condition | Measurement apparatus | SmartLab manufactured by Rigaku Corporation |
|---|---|---|
| | Target | Cu |
| | Detector | D/teX Ultra HE manufactured by Rigaku Corporation |
| | Detector baseline | 44div |
| | Detector window | 8div |
| | Gonio length | 300 mm |
| | Soller/PSC | 5.0 (deg.) |
| | IS long dimension | 10 (mm) |
| | PSA | Open |
| | Soller | 5.0 (deg.) |
| | Monochromatization method | Kβ filter method |
| Sample condition | Sample holder | Diameter: 24 mm, depth: 0.5 mm |
| | Rotation of sample during measurement | Rotated (30 rpm) |
| Measurement condition | Measurement method | General purpose measurement (focal method) |
| | Scanning axis | 2θ/θ |
| | Mode | Continuous |
| | Range specification | Absolute |
| | Initiation (deg.) | 15 (deg.) |
| | Termination (deg.) | 75 (deg.) |
| | Step (deg.) | 0.0052 (deg.) |
| | Speed measurement time | 1 (deg./min.) |
| | IS (deg.) | ⅓ (deg.) |
| | RS1 (mm) | 8 (mm) |
| | RS2 (mm) | 13 (mm) |
| | Attenuator | Open |
| | Tube voltage (kV) | 45 (kV) |
| | Tube current (mA) | 200 (mA) |
| Data processing condition | Analysis software | PDXL2 manufactured by Rigaku Corporation |
| | Smoothing | Smoothing by B-Spline, χ threshold: 1.50 |
| | Background removal | Fitting |
| | Kα2 removal | Intensity ratio: 0.4970 |
| | Peak search | Secondary differentiation, σ cut: 3.00 |
| | Profile fitting | Fitting of measurement data |
| | Peak shape | Variance pseudo-voigt function |

(Transmission X-Ray Diffraction)

Transmission X-ray diffraction measurement of the lithium-containing composite oxide was carried out employing synchrotron radiation (SPring-8 beam line BL19B2). The measurement conditions are shown in Table 2. Measurement was carried out at 25° C. Before the measurement, 1 g of the lithium-containing composite oxide and 10 mg of an X-ray diffraction standard sample 640d were mixed in an agate mortar, and the mixture was used as a measurement sample.

With respect to the obtained transmission X-ray diffraction pattern, peak search was carried out using integrated X-ray powder diffraction software PDXL2 manufactured by Rigaku Corporation. From the respective peaks, $I_{0\ 0\ 3}/I_{1\ 0\ 4}$ of the lithium-containing composite oxide was obtained.

TABLE 2

| Measurement conditions | Beam line | SPring-8 BL19B2 |
|---|---|---|
| | Lindemann glass capillary | 0.3 mm diameter |
| | Wavelength | 0.5 Å |
| | Exposure time | 5 minutes |
| | Mirror angle | 1.8° |
| | Imaging plate reading sensitivity | L4-S1000 |
| Data processing condition | Analysis software | PDXL2 manufactured by Rigaku Corporation |
| | Smoothing | Smoothing by B-Spline, χ threshold: 1.50 |
| | Background removal | Fitting |
| | Peak search | Secondary differentiation, σ cut: 3.00 |
| | Profile fitting | Fitting of measurement data |
| | Peak shape | Variance pseudo-voigt function |

Of the lithium-containing composite oxide, $I_{0\ 0\ 3}/I_{1\ 0\ 4}$ obtained by reflection X-ray diffraction and $I_{0\ 0\ 3}/I_{1\ 0\ 4}$ obtained by transmission X-ray diffraction were respectively calculated and their ratio was calculated.

Further, of the lithium-containing composite oxide, $I_{0\ 0\ 3}/I_{1\ 0\ 4}$ obtained by reflection X-ray diffraction and $I_{0\ 0\ 3}/I_{1\ 0\ 4}$ obtained by transmission X-ray diffraction were respectively calculated, and their difference was calculated.

(Particle Size)

The cathode active material was sufficiently dispersed in water by ultrasonic treatment, and the measurement was conducted by a laser diffraction/scattering type particle size distribution measuring apparatus (MT-3300EX manufactured by NIKKISO CO., LTD.), to obtain the frequency distribution and cumulative volume distribution curve, whereby the volume-based particle size distribution was obtained. From the obtained cumulative volume distribution curve, $D_{50}$ was obtained.

(Specific Surface Area)

The specific surface area of the cathode active material was calculated by a nitrogen adsorption BET method using a specific surface area measuring apparatus (HM model-1208, manufactured by Mountech Co., Ltd.). Degassing was carried out at 200° C. for 20 minutes.

(Production of Positive Electrode Sheet)

The cathode active material obtained in each Ex., a conductive carbon black as an electrically conductive material and polyvinylidene fluoride as a binder were weighed in a mass ratio of 90:5:5, and they were added to N-methylpyrrolidone to prepare a slurry.

The slurry was applied on one side of an aluminum foil having a thickness of 20 μm as a positive electrode current collector by means of a doctor blade. The gap of the doctor blade was adjusted so that the thickness of the sheet after roll pressing would be 50 μm. After vacuum drying at 90° C., roll pressing was carried out twice to prepare a positive electrode sheet.

(Production of Lithium Secondary Battery)

The positive electrode sheet was punched out into a circle having a diameter of 18 mm, which was used as a positive electrode.

A metal lithium foil (manufactured by The Honjo Chemical Corporation, Lithium Foil) as a negative electrode material, was punched out into a circle having a diameter of 19 mm, which was used as a negative electrode.

As a separator, a porous polypropylene (manufactured by Celgard, LLC., Celgard (registered trademark) #2500) having a thickness of 25 μm was used.

As an electrolytic solution, a liquid having $LiPF_6$ dissolved at a concentration of 1 mol/dm$^3$ in a solvent mixture of ethylene carbonate and diethyl carbonate in a volume ratio of 1:1, was used.

Using the positive electrode, the negative electrode, the separator and the electrolytic solution, a stainless steel simple sealed cell type lithium secondary battery was assembled in an argon globe box.

(Cycle Characteristics)

The lithium secondary battery was subjected to 50 charge and discharge cycles, each cycle comprising constant current and constant voltage charging to 4.5 V with a load current of 192 mA per 1 g of the cathode active material, and then constant current discharging to 2.75 V with a load current of 160 mA per 1 g of the cathode active material. The capacity retention and the voltage retention after 50 cycles were obtained.

The capacity retention (%) after 50 cycles is a proportion (%) of the discharge capacity at the 50th 4.5 V charging based on the discharge capacity at the first 4.5 V charging.

(Porosity)

The cathode active material was recovered from the positive electrode of the lithium ion secondary battery after 50 cycles.

The cathode active material embedded in an epoxy resin was abraded with diamond abrasive grains, and the cross section of the secondary particles was observed with a scanning electron microscope (SEM).

The 3,000 magnification SEM image of the cross section was binarized by an image analysis software. In the binarized image, a void portion in the secondary particles was colored in a third color (green). The porosity (%) was obtained in accordance with the following formula (II), where NA is the total number of dots at a portion where primary particles are present in the cross section of the secondary particles (white portion), and NB is the total number of dots at a void portion (green portion) in the cross section of the secondary particles. The porosities of totally 20 secondary particles were obtained, and their average was taken as the porosity in the cross section of the secondary particles.

$$\text{Porosity} = (N_B/(N_A + N_B)) \times 100 \quad \text{Formula (II)}$$

(Ex. 1)

A hydroxide (manufactured by Sumitomo Metal Mining Co., Ltd.) as identified in Table 3 obtained by coprecipitation method, and lithium carbonate (manufactured by SQM, MIC grade) were weighed so that the molar ratio of Li to X (wherein X is the total molar amount of Ni, Co and Mn) (Li/X) would be as identified in Table 3. Then, a zirconium oxide powder (manufactured by NIPPON DENKO CO., LTD., tradename: PCS) was weighed in an amount of 0.3 mol % based on the metal content (excluding Li) in the lithium composite oxide. Then, the lithium carbonate, the hydroxide and the zirconium oxide were mixed.

The obtained mixture was fired in a continuous firing furnace while air was supplied in an air atmosphere at 920° C. for 8 hours to obtain a lithium-containing composite oxide, which was used as the cathode active material. Hereinafter, the firing temperature was a value indicated by universal thermal history sensors (manufactured by Japan Fire Ceramics Center, Referthermo). The results of analysis of the cathode active material and evaluation of a battery using the cathode active material are shown in Tables 3 and 4.

Figure 1:
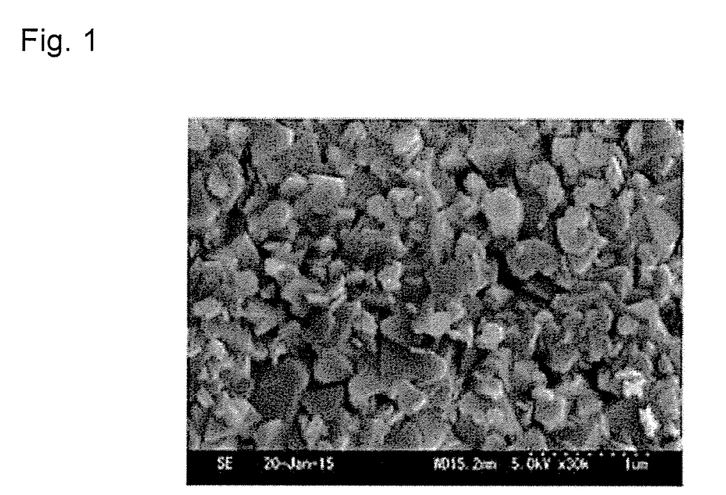
FIG. 1 is a 30,000 magnification scanning electron microphotograph of the hydroxide used in Ex. 1.
Figure 2:
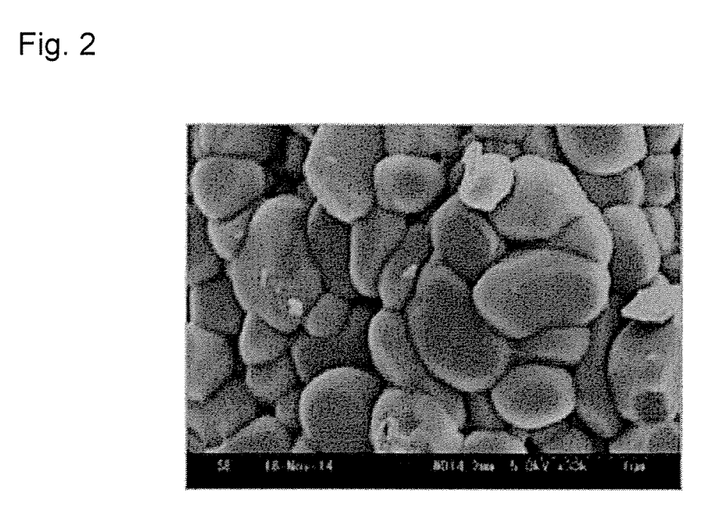
FIG. 2 is a 30,000 magnification scanning electron microphotograph of the lithium-containing composite oxide in Ex. 1.
Figure 3:
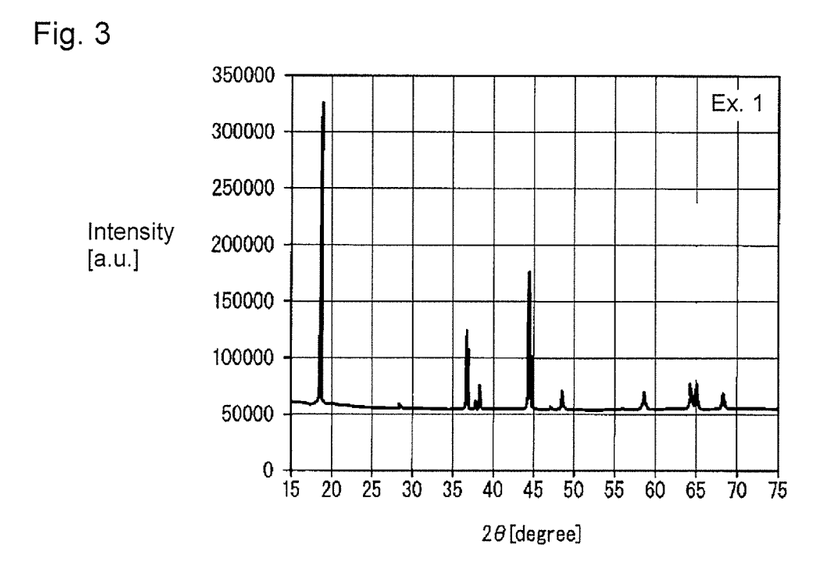
FIG. 3 is a diagram illustrating an X-ray diffraction pattern of the lithium-containing composite oxide in Ex. 1 obtained by reflection X-ray diffraction employing Cu-Kα rays.
Figure 4:
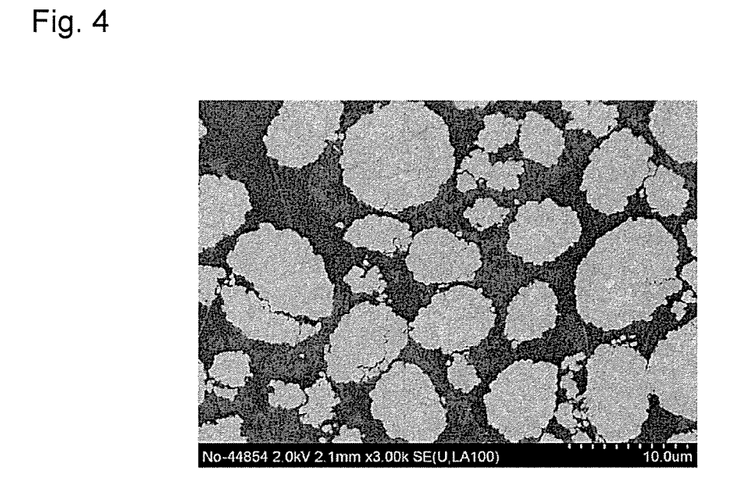
FIG. 4 is a 3,000 magnification scanning electron microphotograph of the cross section of the cathode active material in Ex. 1 after 50 cycles.

The 30,000 magnification SEM photograph of the hydroxide is shown in FIG. 1. The 30,000 magnification SEM photograph of the lithium-containing composite oxide is shown in FIG. 2. The reflection X-ray diffraction pattern of the lithium-containing composite oxide is shown in FIG. 3. The 3,000 magnification SEM photograph of the cross section of the cathode active material after 50 cycles is shown in FIG. 4.

(Ex. 2)

Figure 5:
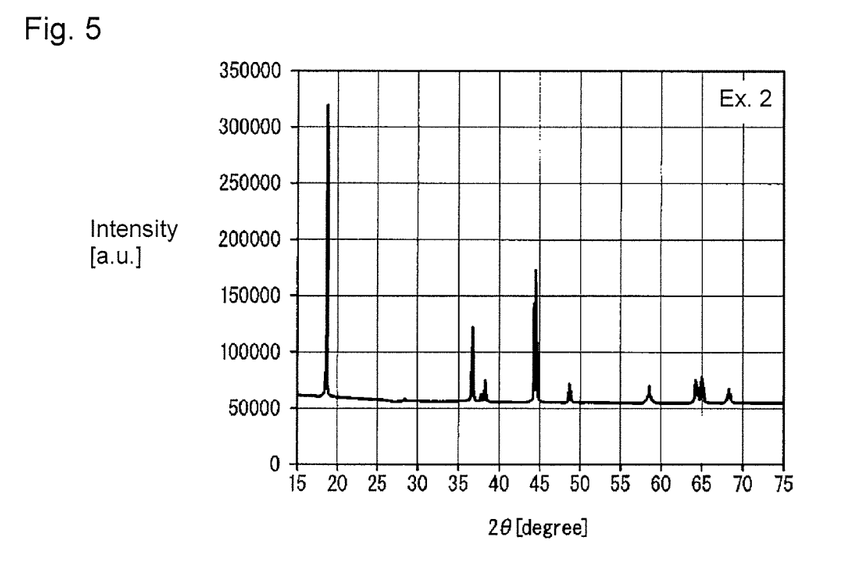
FIG. 5 is a diagram illustrating an X-ray diffraction pattern of the lithium-containing composite oxide in Ex. 2 obtained by reflection X-ray diffraction employing Cu-Kα rays.

In the same manner as in Ex. 1 except that the mixture was fired by using an electric furnace instead of the continuous firing furnace, a lithium-containing composite oxide was obtained, which was used as the cathode active material. The results of analysis of the cathode active material and evaluation of a battery using the cathode active material are shown in Tables 3 and 4. The reflection X-ray diffraction pattern of the lithium-containing composite oxide is shown in FIG. 5.

(Ex. 3)

Figure 6:
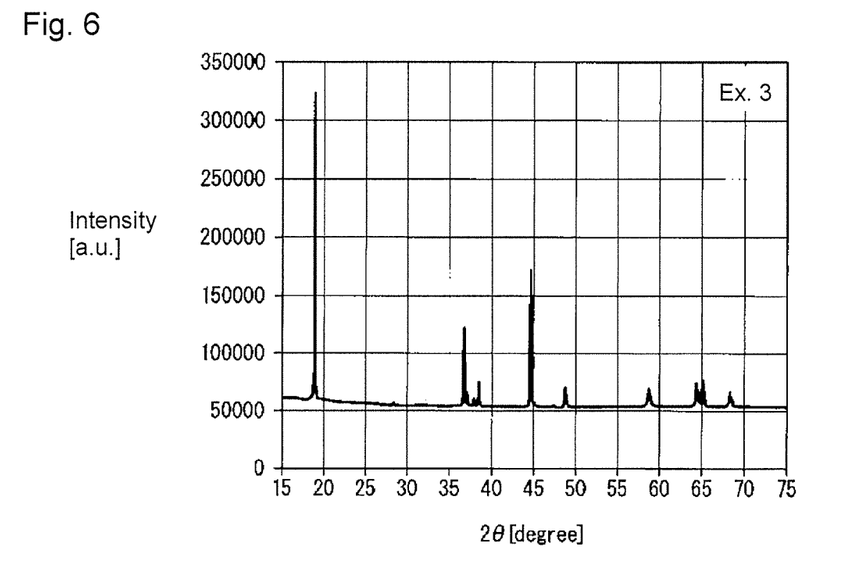
FIG. 6 is a diagram illustrating an X-ray diffraction pattern of the lithium-containing composite oxide in Ex. 3 obtained by reflection X-ray diffraction employing Cu-Kα rays.

A lithium-containing composite oxide was obtained in the same manner as in Ex. 2. To the lithium-containing composite oxide (100 mass %), a diluent of a Zr-containing aqueous solution (manufactured by Nippon Light Metal Co., Ltd., BAYCOAT 20) in an amount of 7 mass % was sprayed and mixed. The obtained mixture was fired in an electric furnace while air was supplied in an air atmosphere at 500° C. for 8 hours to obtain a cathode active material. The amount of the covering Zr to the total metal content (excluding Li) (100 mol %) of the lithium-containing composite oxide was 0.5 mol %. The results of analysis of the cathode active material and evaluation of a battery using the cathode active material are shown in Tables 3 and 4. The reflection X-ray diffraction pattern of the lithium-containing composite oxide is shown in FIG. 6.

(Ex. 4)

Figure 7:
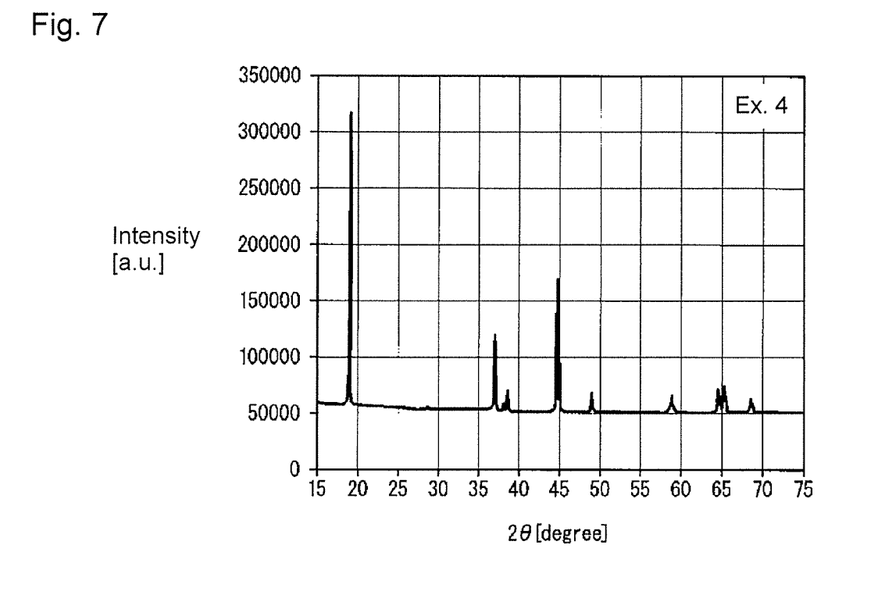
FIG. 7 is a diagram illustrating an X-ray diffraction pattern of the lithium-containing composite oxide in Ex. 4 obtained by reflection X-ray diffraction employing Cu-Kα rays.

In the same manner as in Ex. 2 except that the firing temperature was changed to 930° C., a lithium-containing composite oxide was obtained, which was used as the cathode active material. The results of analysis of the cathode active material and evaluation of a battery using the cathode active material are shown in Tables 3 and 4. The reflection X-ray diffraction pattern of the lithium-containing composite oxide is shown in FIG. 7.

(Ex. 5)

A hydroxide (manufactured by Sumitomo Metal Mining Co., Ltd.) as identified in Table 3 obtained by coprecipitation method and lithium carbonate (manufactured by SQM, MIC grade) were weighed so that the molar ratio of Li to X (wherein X is the total molar amount of Ni, Co and Mn) (Li/X) would be as identified in Table 3. Then, a tungsten oxide powder (manufactured by Aldrich, tradename: Tungsten (IV) Oxide nanopowder, particle size<100 nm (TEM measurement)) was weighed in an amount of 0.3 mol % based on the metal content (excluding Li) in the lithium composite oxide. Then, the lithium carbonate, the hydroxide and the tungsten oxide were mixed.

The obtained mixture was fired in an electric furnace while air was supplied in an air atmosphere at 930° C. for 8 hours to obtain a lithium-containing composite oxide, which was used as the cathode active material. The results of analysis of the cathode active material and evaluation of a battery using the cathode active material are shown in Tables 3 and 4.

(Ex. 6)

Figure 8:
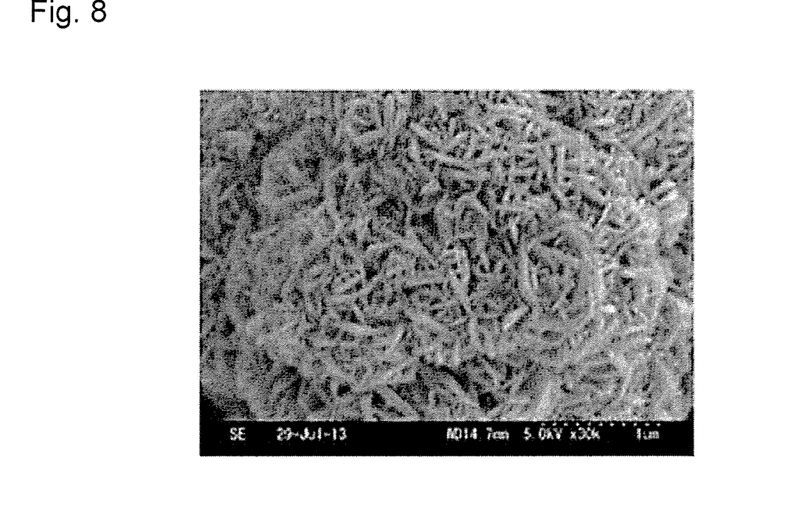
FIG. 8 is a 30,000 magnification scanning electron microphotograph of the hydroxide used in Ex. 6.
Figure 9:
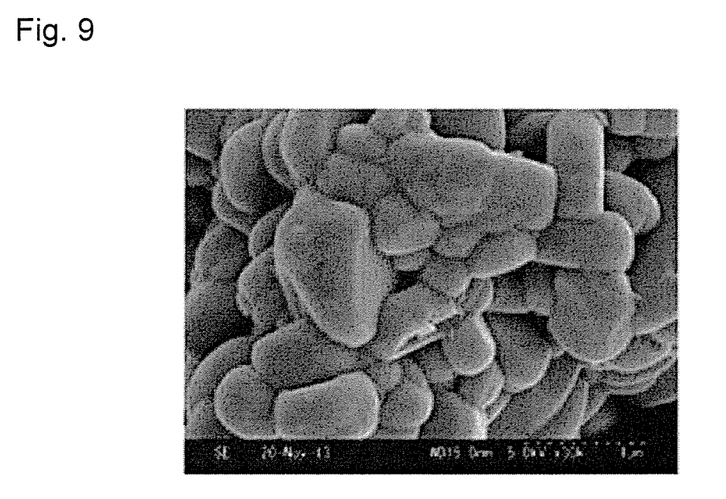
FIG. 9 is a 30,000 magnification scanning electron microphotograph of the lithium-containing composite oxide in Ex. 6.
Figure 10:
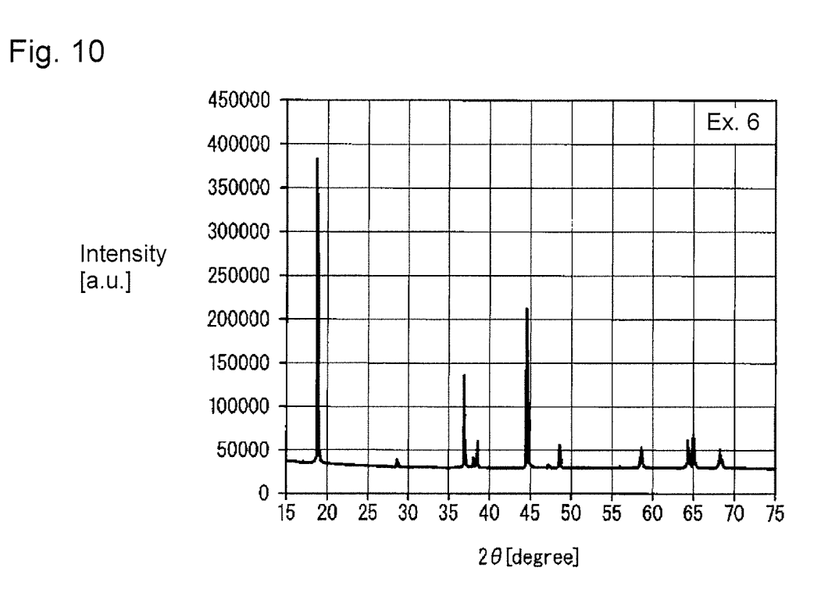
FIG. 10 is a diagram illustrating an X-ray diffraction pattern of the lithium-containing composite oxide in Ex. 6 obtained by reflection X-ray diffraction employing Cu-Kα rays.
Figure 11:
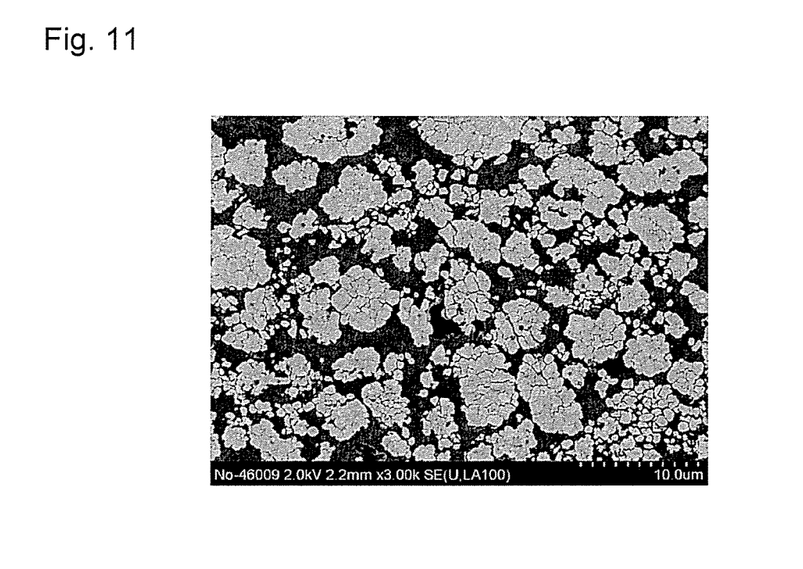
FIG. 11 is a 3,000 magnification scanning electron microphotograph of the cross section of the cathode active material in Ex. 6 after 50 cycles.

In the same manner as in Ex. 1 except that the hydroxide in Ex. 1 was changed to a hydroxide (manufactured by ISE CHEMICALS CORPORATION) in Ex. 6 as identified in Table 3, a lithium-containing composite oxide was obtained, which was used as a cathode active material. The results of analysis of the cathode active material and evaluation of a battery using the cathode active material are shown in Tables 3 and 4. The 30,000 magnification SEM photograph of the hydroxide is shown in FIG. 8. The 30,000 magnification SEM photograph of the lithium-containing composite oxide is shown in FIG. 9. The reflection X-ray diffraction pattern of the lithium-containing composite oxide is shown in FIG. 10. The 3,000 magnification SEM photograph of the cross section of the cathode active material after 50 cycles is shown in FIG. 11.

discharge cycle at a high voltage, and the lithium secondary battery had a high capacity retention.

In Ex. 6, although the lithium-containing composite oxide was represented by the formula (I), $I_{104}/I_{110}$ in the reflection X-ray diffraction pattern was less than 4.20, the lithium-containing composite oxide was broken or cracked when repeatedly subjected to a charge and discharge cycle at a high voltage, and the lithium secondary battery had a low capacity retention.

Further, of the lithium-containing composite oxide in each of Ex. 1 to 5, with respect to the $I_{003}/I_{104}$ value, the ratio of the value in the reflection X-ray diffraction pattern to the value in the transmission X-ray diffraction pattern respectively calculated was at least 1.18. Such a lithium-containing composite oxide was hardly broken or cracked even when repeatedly subjected to a charge and discharge cycle at a high voltage, and further, the lithium secondary battery using such a lithium-containing composite oxide had a high capacity retention.

On the other hand, of the lithium-containing composite oxide in Ex. 6, with respect to the $I_{003}/I_{104}$ value, the ratio of the value in the reflection X-ray diffraction pattern to the value in the transmission X-ray diffraction pattern respec-

TABLE 3

| | Hydroxide composition [molar ratio %] | | | Oxide obtained by heating hydroxide | Charge | | Firing temperature [° C.] | Lithium-containing composite oxide $Li_aNi_bCo_cMn_dM_eO_2$ (a + b + c + d + e = 2) | | | | |
|---|---|---|---|---|---|---|---|---|---|---|---|---|
| | | | | | Li/X | Type of M | | | | | | |
| Ex. | Ni | Co | Mn | $I_{222}/I_{400}$ | | M | [mol %] | | a | b | c | d | e |
| 1 | 45.1 | 30.1 | 24.8 | 0.316 | 1.073 | Zr | 0.3 | 920 | 1.034 | 0.434 | 0.290 | 0.239 | 0.003 |
| 2 | 45.1 | 30.1 | 24.8 | 0.316 | 1.073 | Zr | 0.3 | 920 | 1.034 | 0.434 | 0.290 | 0.239 | 0.003 |
| 3 | 45.1 | 30.1 | 24.8 | 0.316 | 1.073 | Zr | 0.3 | 920 | 1.034 | 0.434 | 0.290 | 0.239 | 0.003 |
| 4 | 45.1 | 30.1 | 24.8 | 0.316 | 1.074 | Zr | 0.3 | 930 | 1.034 | 0.434 | 0.290 | 0.239 | 0.003 |
| 5 | 45.0 | 30.0 | 25.0 | 0.323 | 1.074 | W | 0.3 | 930 | 1.034 | 0.433 | 0.289 | 0.241 | 0.003 |
| 6 | 45.1 | 29.9 | 25.0 | 0.309 | 1.081 | Zr | 0.3 | 920 | 1.034 | 0.434 | 0.288 | 0.241 | 0.003 |

TABLE 4

| | Lithium-containing composite oxide | | | | | | Cathode active material | | Lithium secondary battery | |
|---|---|---|---|---|---|---|---|---|---|---|
| Ex. | $D_{110}$ [nm] | $I_{104}/I_{110}$ | Ratio of $I_{003}/I_{104}$ by reflection method to that by transmission method | Difference in $I_{003}/I_{104}$ between reflection method and transmission method | Covering Element contained | [mol %] | $D_{50}$ [μm] | Specific surface area [m²/g] | Capacity retention after 50 cycles [%] | Porosity of cathode active material after 50 cycles [%] |
| 1 | 55.7 | 4.38 | 1.23 | 0.250 | — | — | 9.0 | 0.36 | 99.5 | 0.4 |
| 2 | 55.3 | 4.36 | 1.22 | 0.247 | — | — | 9.4 | 0.35 | 98.0 | — |
| 3 | 56.2 | 4.28 | 1.24 | 0.270 | Zr | 0.5 | 8.9 | 0.40 | 99.0 | — |
| 4 | 55.4 | 4.32 | 1.28 | 0.300 | — | — | 9.5 | 0.37 | 100.1 | — |
| 5 | 48.3 | 4.42 | 1.20 | 0.220 | — | — | 10.8 | 0.33 | 99.6 | — |
| 6 | 70.7 | 4.17 | 1.16 | 0.178 | — | — | 6.0 | 0.71 | 92.6 | 3.0 |

Figure 12:
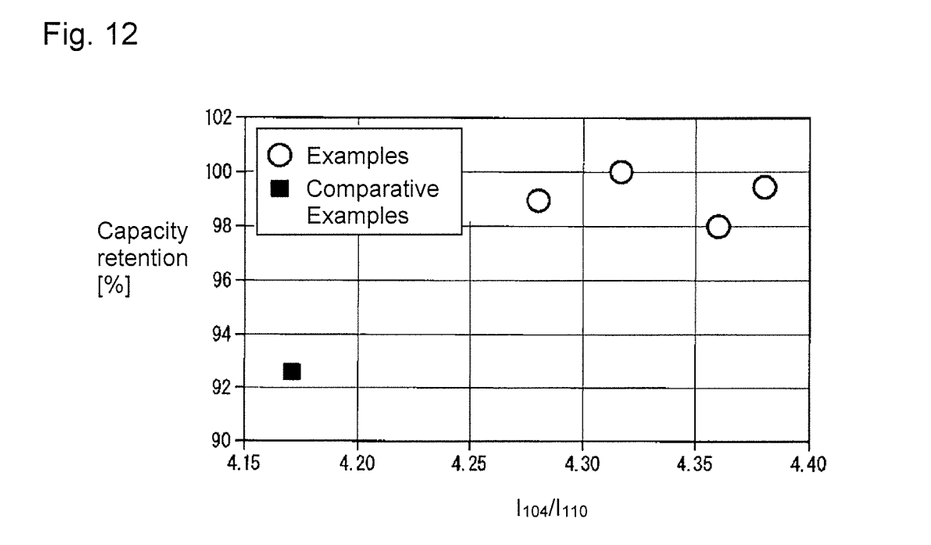
FIG. 12 is a graph illustrating the relation between $I_{104}/I_{110}$ in an X-ray diffraction pattern of the lithium-containing composite oxide in each of Ex. 1 to 4 and 6 obtained by reflection X-ray diffraction employing Cu-Kα rays, and the capacity retention of the lithium ion secondary battery.

The relation between $I_{104}/I_{110}$ of the lithium-containing composite oxide in each of Ex. 1 to 4 and 6 and the capacity retention of the lithium ion secondary battery is shown in FIG. 12.

In Ex. 1 to 5, since the lithium-containing composite oxide was represented by the formula (I), and $I_{104}/I_{110}$ in the reflection X-ray diffraction pattern was at least 4.20, the lithium-containing composite oxide was hardly broken or cracked even when repeatedly subjected to a charge and tively calculated was less than 1.18. Such a lithium-containing composite oxide was broken or cracked when repeatedly subjected to a charge and discharge cycle at a high voltage, and the lithium secondary battery using such a lithium-containing composite oxide had a low capacity retention.

Further, of the lithium-containing composite oxide in each of Ex. 1 to 5, with respect to the $I_{003}/I_{104}$ value, the difference between the value in the reflection X-ray diffraction pattern and the value in the transmission X-ray diffraction pattern respectively calculated was at least 0.18. Such a lithium-containing composite oxide was hardly broken or cracked even when repeatedly subjected to a charge and discharge cycle at a high voltage, and further, the lithium secondary battery using such a lithium-containing composite oxide had a high capacity retention.

On the other hand, of the lithium-containing composite oxide in Ex. 6, with respect to the $I_{003}/I_{104}$ value, the difference between the value in the reflection X-ray diffraction pattern and the value in the transmission X-ray diffraction pattern respectively calculated was less than 0.18. Such a lithium-containing composite oxide was broken or cracked when repeatedly subjected to a charge and discharge cycle at a high voltage, and further, the lithium secondary battery using such a lithium-containing composite oxide had a low capacity retention.

INDUSTRIAL APPLICABILITY

According to the lithium-containing composite oxide of the present invention, it is possible to obtain a lithium ion secondary battery having favorable cycle characteristics even when charged at a high voltage.

The entire disclosure of Japanese Patent Application No. 2016-019044 filed on Feb. 3, 2016 including specification, claims, drawings and summary is incorporated herein by reference in its entirety.

The invention claimed is:

1. A lithium-containing composite oxide which is represented by the following formula (I):

wherein M is at least one member selected from the group consisting of Ca, Al, Ti, Nb, Mo, W and Zr, a+b+c+d+e=2, a is from 1.01 to 1.10, b is from 0.30 to 0.95, c is from 0 to 0.35, d is from 0 to 0.35, and 0<e≤0.05, wherein in an X-ray diffraction pattern obtained by reflection X-ray diffraction employing Cu-Kα rays, the ratio ($I_{104}/I_{110}$) of the integrated intensity ($I_{104}$) of a peak of (104) plane assigned to a crystal structure with space group R-3m to the integrated intensity ($I_{110}$) of a peak of (110) plane assigned to a crystal structure with space group R-3m is at least 4.20.

2. The lithium-containing composite oxide according to claim 1, wherein with respect to the ratio ($I_{003}/I_{104}$) of the integrated intensity ($I_{003}$) of a peak of (003) plane assigned to a crystal structure with space group R-3m to the integrated intensity ($I_{104}$) of a peak of (104) plane assigned to a crystal structure with space group R-3m in an X-ray diffraction pattern of the lithium-containing composite oxide, the value obtained by dividing the above ratio obtained by reflection X-ray diffraction employing Cu-Kα rays, by the above ratio obtained by transmission X-ray diffraction employing synchrotron radiation, is at least 1.18.

3. The lithium-containing composite oxide according to claim 1, wherein with respect to the ratio ($I_{003}/I_{104}$) of the integrated intensity ($I_{003}$) of a peak of (003) plane assigned to a crystal structure with space group R-3m to the integrated intensity ($I_{104}$) of a peak of (104) plane assigned to a crystal structure with space group R-3m in an X-ray diffraction pattern of the lithium-containing composite oxide, the value obtained by subtracting the above ratio obtained by transmission X-ray diffraction employing synchrotron radiation, from the above ratio obtained by reflection X-ray diffraction employing Cu-Kα rays, is at least 0.18.

4. The lithium-containing composite oxide according to claim 1, wherein in the formula (I), a+b+c+d+e=2, a is from 1.01 to 1.10, b is from 0.40 to 0.55, c is from 0.15 to 0.35, d is from 0.20 to 0.35, and 0<e≤0.05.

5. The lithium-containing composite oxide according to claim 1, wherein in an X-ray diffraction pattern of the lithium-containing composite oxide obtained by reflection X-ray diffraction employing Cu-Kα rays, the crystallite size obtained in accordance with the Scherrer equation from a peak of (110) plane assigned to a crystal structure with space group R-3m is from 30 to 70 nm.

6. A cathode active material containing the lithium-containing composite oxide as defined in claim 1.

7. The cathode active material according to claim 6, wherein $D_{50}$ of the cathode active material is from 3 to 15 μm.

8. A positive electrode for a lithium ion secondary battery, which comprises the cathode active material as defined in claim 6, an electrically conductive material and a binder.

9. A lithium ion secondary battery, which comprises the positive electrode for a lithium ion secondary battery as defined in claim 8, a negative electrode, a separator and a non-aqueous electrolyte.

10. A lithium-containing composite oxide which is represented by the following formula (I):

wherein M is at least one member selected from the group consisting of Ca, Al, Ti, Nb, Mo, W and Zr, a+b+c+d+e=2, a is from 1.01 to 1.10, b is from 0.30 to 0.95, c is from 0 to 0.35, d is from 0 to 0.35, and 0<e≤0.05, wherein in an X-ray diffraction pattern obtained by reflection X-ray diffraction employing Cu-Kα rays, the ratio ($I_{104}/I_{110}$) of the integrated intensity ($I_{104}$) of a peak of (104) plane assigned to a crystal structure with space group R-3m to the integrated intensity ($I_{110}$) of a peak of (110) plane assigned to a crystal structure with space group R-3m is at least 4.20 and at most 5.00.

11. The lithium-containing composite oxide according to claim 1, wherein c is from 0.25 to 0.35.

12. A lithium-containing composite oxide which is represented by the following formula (I):

wherein M is at least one member selected from the group consisting of Ca, Al, Ti, Nb, Mo, and Zr, a+b+c+d+e=2, a is from 1.01 to 1.10, b is from 0.30 to 0.95, c is from 0 to 0.35, d is from 0 to 0.35, and 0<e≤0.05, wherein in an X-ray diffraction pattern obtained by reflection X-ray diffraction employing Cu-Kα rays, the ratio ($I_{104}/I_{110}$) of the integrated intensity ($I_{104}$) of a peak of (104) plane assigned to a crystal structure with space group R-3m to the integrated intensity ($I_{110}$) of a peak of (110) plane assigned to a crystal structure with space group R-3m is at least 4.20.

* * * * *